Plate, 1.    4 Plates

Theophilus Weaver's  
Spherical Gears.

117706    PATENTED AUG 1 1871

Witnesses,  
Peter Stricker  
John Worley

Inventor,  
Theophilus Weaver

Plate 2. 4 Plates

Theophilus Weaver's, Spherical Gears.

Witnesses
Peter Stucker
John Worley

Inventor
Theophilus Weaver

AM. PHOTO-LITHOGRAPHIC CO. N.Y. (OSBORNE'S PROCESS)

Plate 3.    4 Plates

Theophilus Weaver's

117706   *Spherical Gears*

Witnesses
Peter Rucker
John Worley

Inventor
Theophilus Weaver

Plate 4.

Theophilus Weaver's

4 Plates

117706 Spherical Gears.

Witnesses
Peter Stucker
John Worley

Inventor
Theophilus Weaver

AM. PHOTO-LITHOGRAPHIC CO. N.Y. (OSBORNE'S PROCESS.)

UNITED STATES PATENT OFFICE.

THEOPHILUS WEAVER, OF HARRISBURG, PENNSYLVANIA.

IMPROVEMENT IN SPHERICAL GEARS.

Specification forming part of Letters Patent No. 117,706, dated August 1, 1871.

*To all whom it may concern:*

Be it known that I, THEOPHILUS WEAVER, of the city of Harrisburg, county of Dauphin and State of Pennsylvania, have invented a certain System of Spherical Gears, of which the following is a specification:

The nature of my invention consists, essentially, of a sphere and its matrix or mate, united by any means by which the motion of the one may be communicated to the other, or by which the motion of the one may be modified or converted in the act of communication to the other.

The first part of my invention, therefore, relates to the spherical form whereby a union of the centers of motion is effected in a peculiar manner, so that the shafting may be directed to all points of the compass around the sphere, and whereby the shafting may be, to a large extent, united without the extraneous support of hangers and frame-work. The second part of my invention relates to certain grooves, ledges, or tablets on the surface of the sphere, and certain trunnions in the spherically-dished matrix whereby the motion is communicated, converted, or modified from one to the other. The third part of my invention relates to certain masks or covers by which the works are muffled, and rendered noiseless and harmless, and the masks are also used to couple shafting, and may be used to attach hangers to them above and supports to them beneath. The fourth part of my invention relates to certain relievo cuttings in the matrix to reduce the friction to the lowest limit, and to provide for ample lubrication, and also relates to certain anti-friction rollers on the sphere-shaft. The fifth part of my invention relates to the exterior form of the matrix or circulator, whereby it may be adapted for use as a pulley or fly-wheel. The sixth part of my invention relates to certain modifications of the rim of the matrix or circulator, by which a multiplied radiation of axes may be obtained, and different rates of speed in the moving parts about the same sphere. The seventh part of my invention relates to a transverse bisection of the sphere, by means of which one-half becomes a loose washer or standard for supporting a duplicate moving part, and the other half still remains a complete spherical driver in oblique gears. The eighth part of my invention relates to the distribution and arrangement of the trunnions in the matrix or circulator, whereby the kind or speed of the motion is effected. The ninth part of my invention relates to a mode of connecting the matrix and the sphere in oblique gears, constituting a universal joint.

In the accompanying drawing, plate 1 represents simple ecliptic gear.

Plate 2 represents double and compound ecliptic gear. Figure 1 represents double ecliptic gear. Fig. 2 is a view of centric compound ecliptic gear. Figs. 3, 4, 5, 5, 6, 7, 8, and 9 are views of eccentric compound ecliptic gear.

Plate 3 represents simple and compound polar gear. Figures 1 and 2 are views of the simple polar gear. Figs. 3, 4, 5, 6, 7, 8, and 11 are views of compound polar gear. Figs. 9 and 10 are views of compound polar gear and its connections.

Plate 4 represents modified ecliptic gears. Figures 1, 2, and 3 are views of ultra polar or star gear. Figs. 4 and 5 represent double crescent gear. Figs. 6 and 7 represent the diamond-necklace gear. Figs. 8 and 9 represent the meridian-gear. Figs. 4, 6, and 8 are polar projections of the last three kinds of gears. Figs. 5, 7, and 9 are plans of the last three kinds of gears, showing the constellations of the trunnions of the matrices or circulators, and the ecliptic tablets distended on a plane, similar to the mode of Mercator's chart.

Brevity of description requires that the following technicalities should be defined:

The ecliptic is a circular groove or ledge girdling the sphere, whose plane, when viewed edgewise from the horizon, has an inclination or pitch, either in relation to the axis of the sphere, if it is an oblique sphere, or in relation to the matrix axis, if the sphere is a right sphere.

A right sphere is one whose poles are in the visual horizon, and the plane of the ecliptic passes through them.

An oblique sphere is one whose poles are not in the ecliptic plane, whether in the visual horizon or not.

The solstices are the points on the sphere-surface where the plane of the ecliptic lies nearest the poles. Right spheres have no solstices.

The maximeter is the great circle on the sphere equidistant from its poles, and is not an equator, but a line of greatest velocity.

The nodes are the points on the sphere where the maximeter and the ecliptic intersect.

The axial quadrants are those divisions of the sphere-surface made by two intersecting ecliptics through which the sphere-axle passes.

The major quadrants are the complements of the axial quadrants.

The ecliptants are the divisions of the sphere-surface made by one ecliptic.

The circuit is that part of the polar zone of a right sphere which is cut away by two or more intersecting ecliptics.

The matrix is the spherically-recessed body which is the mate of the sphere; when its throw is limited by the nodal points it is termed a sequinode; when its throw is limited by the solsticial points it is termed a sequistice; when its motion is unlimited its trunnion or trunnions describe circles around the sphere, and it is termed a circulator.

The radial distance is the ordinate drawn from a trunnion in the matrix to the imaginary matrix axis.

In all the plates similar letters denote similar parts.

M is the sphere-axle. N is a ring on axle to fill the cross-section of the matrix. It is a part of the sphere. B is an ecliptic, which is a groove, but may be a ledge. $B^1 B^2 B^3$ are duplicate ecliptics. E is the maximeter. K is a matrix, made in form of a cylindrical block or hemispherical cup outside, and spherically recessed inside so as to match the curve of the sphere. It is termed sequinode, sequistice, or circulator, in different gears. K' is a duplicate matrix on same sphere. Q Q' and P P' are the hubs and shafts of the matrices respectively. A is a trunnion on the inner wall of the matrix. $A^1 A^2 A^3 A^4$ are duplicate trunnions. They are termed trunnions because the ecliptic turns or reverses itself about them at the solstices in reciprocatory motion. J J' are the axial quadrants. $a\ a$ are the ecliptants. The remaining letters, not being general, are treated as special.

Figures 1, 2, 3, 4, 5:
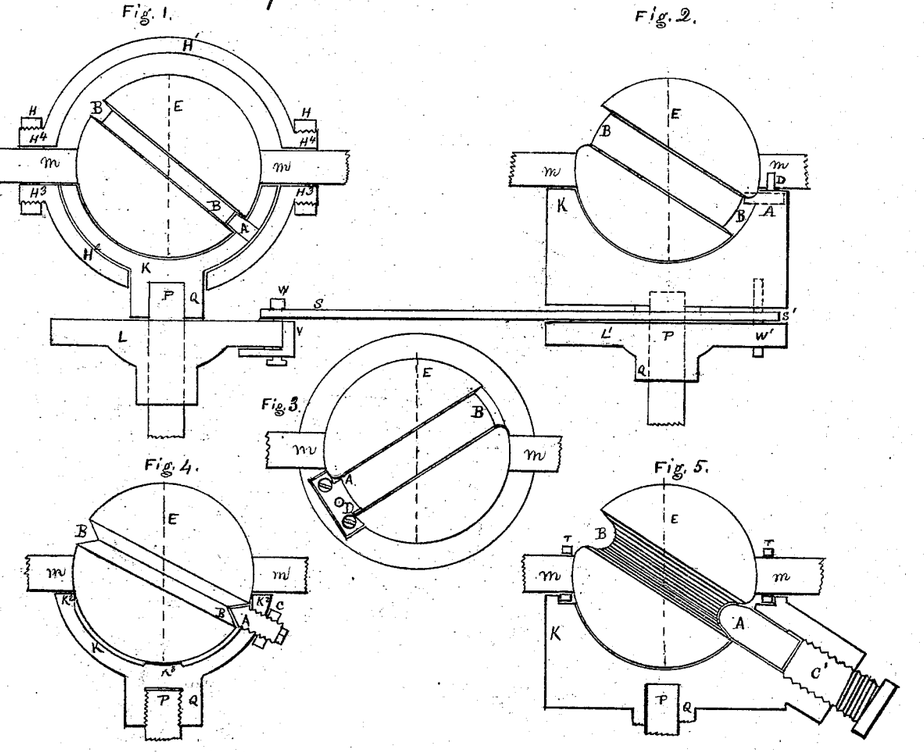
Figure 1 is a view of a driving-sphere connected with subject of Fig. 2.
Fig. 2 is a view of a driven sphere connected with subject of Fig. 1. The masks and matrices are shown in vertical section.
Figs. 3, 4, 5, and 6 are modifications of Figs. 1 and 2.
Figures 1, 2, 3, 4, 5, 6, 7, 8, 9:
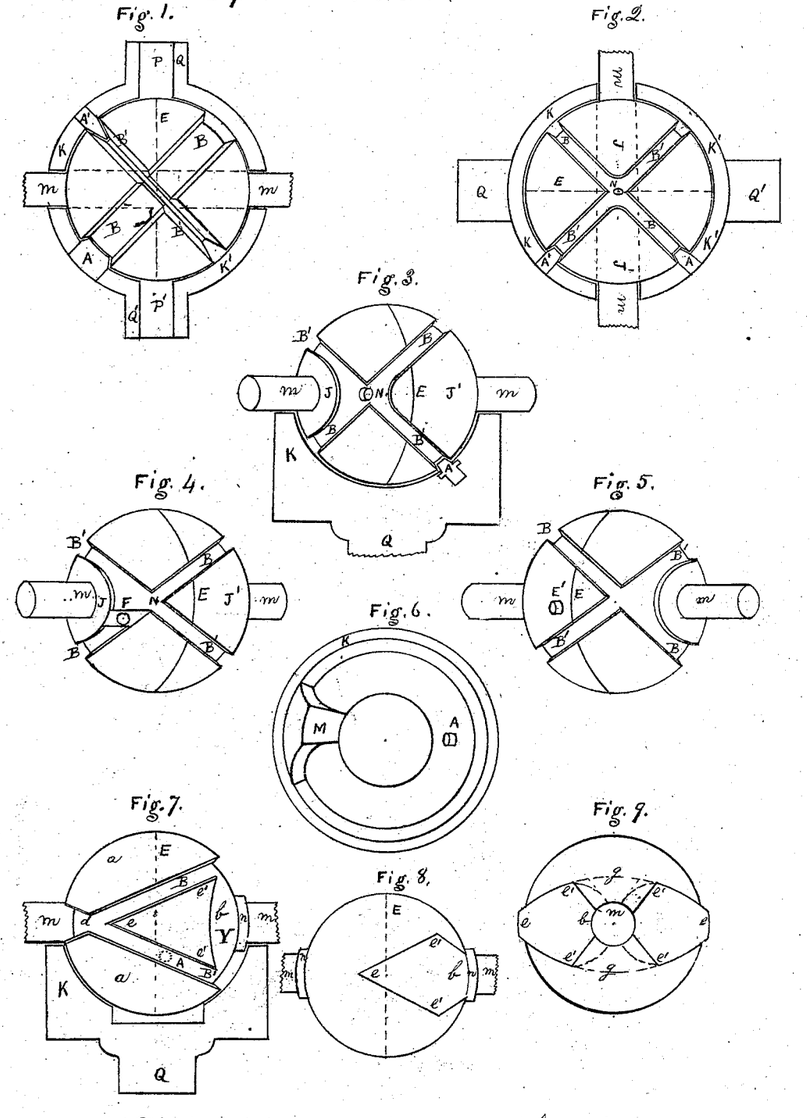
Fig. 7 represents a sphere in a stationary matrix or bed.

Résumé of plate 1: Figure 1 represents a driving-sphere, provided with an ecliptic at any practical pitch, as about forty-five degrees inclined from the axis of the sphere, superimposed on a shell-matrix which it rocks from solstice to solstice by means of the trunnion A, causing the matrix to sweep an arc of about one hundred and sixty degrees. The length of said arc may be varied by the position of trunnion A in relation to the matrix center. The radial distance of the trunnion must not be less than the distance of the solstice from the maximeter, unless the solstice is flattened to effect clearance for the trunnion where its motion in the ecliptic groove is reversed, but the radial distance may be increased until the trunnion is brought up to the lower edge of the sphere-axle. The throw of the matrix is shortened as said radial distance is increased. If the ecliptic has more inclination the compass of variation will be greater. The rocking motion of the matrix of Fig. 1 is transmitted to the matrix of Fig. 2 by a connecting-rod, S S', which is pivoted at its ends by pins W W' to disks L L' on the shafts of the matrices. In Fig. 1 the trunnion is as low as the solstice of the sphere; in Fig. 2 it is higher than the solstice capacity. The difference therefore in the throw of the two matrices is great enough to make up for lost motion in the act of transmission, and a surplus to throw the sphere of Fig. 2 so as to reverse the solstices. Moreover, the ecliptic is cut or rounded abruptly at the solstices so as to widen it toward the axle, and this assists the surplus motion to cock the sphere effectually over the solstices and right the ecliptic for the return stroke. The proposition thus demonstrated is this: Rotary motion of a driving-sphere may be converted into regular or uniform reciprocatory rotary motion, which is transmitted by a connecting-rod as reciprocatory rectilinear motion, which is converted into reciprocatory rectilinear motion, which is finally converted into continuous rotary in another sphere without the use of a crank and without dead-centers. The initial sphere may have the same direction of motion as that of the final sphere, or contrary direction. The direction of the final motion is dependent upon the manner of limiting the throw of the matrix of Fig. 2. If the pin D, which is a stop to limit the throw of the matrix, be so placed as to traverse a like arc on the other side of the axle, the trunnion being shifted to said side, the sphere of Fig. 2 will revolve with the velocity and direction as the sphere of Fig. 1. Any device which may be used instead of a fixed stop, D, will render the final rotary reversible. Some of the consequences of this proposition are: First, a sphere, as shown, provided with a suitable ecliptic, and a matrix whose trunnion gauges the ecliptic sharply into a curved solstice, may be employed as substitutes for the crank and the fly-wheel of a steam-engine, the mass of the sphere being sufficient to balance the motion. Second, the sphere-axle is but a part of a train of machinery which may be run direct from a spherical motor. On steamships the paddle-wheels or screw-propellers may be driven by said axle. The driving-wheels of a locomotive may be driven by said shaft. Third, the matrix may be modified to be a steam-piston imposed on a cylindrical chamber or steam-chest, and its oscillating motion will propel the superimposed sphere. A superior steam-engine may be thus constructed with only about one-fourth the metal now required, and at about one-tenth the present cost. The travel up the incline of the ecliptic may prove to be a saving of power. Fourth, the spherical gear, shown in Fig. 1, produces a uniform reciprocatory motion which is superior to crank-motion for saws, cutter-bars, &c. Fifth, if intermittent, accelerated, and retarded reciprocatory motion is desired, it may be obtained from the gear of Fig. 1 by causing the ecliptic plane to lie to the side of the sphere center, thus causing the solstices to be unequally distant from the sphere-axis. The trunnion must then register with the solstice which is less distant from the sphere-axis. If the motion is desired to be only intermittent the radial distance of the trunnion must be increased. This will foreshorten its throw into the solstices, so that it will not traverse the ecliptic from solstice to solstice. Fig. 3 shows the sphere half-way revolved from the position shown in Fig. 2. The solstices are thus reversed or thrown to the opposite side of the axis of the sphere. Fig. 4 shows a V-shaped cross-section of ecliptic; a trunnion whose point is conical and whose rear end has a jamb-nut, C; a matrix whose inner wall is cut relievo so that the sphere touches only a ring, $K^2$; and a bold stud, $K^3$, to lessen friction and to increase the lubricating capacity. Fig. 5 shows a semi-oval cross-section of ecliptic slot; a trunnion-bolt with oval point, made compensatingly by a set-screw, C′; a matrix whose rim is chamfered to admit friction-rollers T on the sphere-axle. Fig. 6 shows a sphere interposed between two shell-matrices K K′, the trunnions of which may have different radial distances, and therefore the wrist-pins Z Z′ may have motions which are either consecutive to each other, or concentric, or eccentric. Fig. 7 shows a sphere with ecliptic of steep grade imposed on a stationary matrix, whose rim is chamfered to admit the trunnions $u$, and whose bottom is curved and admits between it and the sphere a concentrically-curved shoe or plunger, $S^4$, provided at its one end with a trunnion and a hinge-joint, with connecting-rod $S^3$ at the other end. The shoe may be guided by lugs on said bottom. The revolution of the sphere produces reciprocatory motion in the shoe. The device may be applied to crushers, presses, shears, &c. The power exerted at $S^3$ is as the leverage of the axle is to the arc $B^3$ plus the momentum of the sphere for crushers.

All the figures shown in plate 1 may be modified to produce rotary motion. The solstices must be curved toward the axle. The radial distance must be foreshortened. The speed must be high or fly-wheel employed to carry the trunnion beyond the solstice which has the contrary motion. The rotary thus produced does not seem to be practical, although it closely resembles the motion of the planets.

Résumé of plate 2: Fig. 1 represents a sphere interposed between two shell-matrices, provided with two dissimilar ecliptics, which bisect each other on the maximeter and have the same pitch, but not the same gauge. The one is deep and narrow, the other shallow and broad. Each of the two trunnions, A or A′, is therefore confined to its individual ecliptic. Rotary motion of the sphere is thus converted into two independent rotary oscillations of the sequistices. If now the pitch of the ecliptics or the radial distances of the trunnions be varied, the oscillations will vary. Fig. 2 represents a sphere interposed between two sequinodes, provided with two similar ecliptics, bisected on the maximeter, whose sections form a compound groove. The nodes are closed one way by pins N or ledges, which act as switches to confine the travel of the trunnions around the axial quadrants J J′, which are rounded at their points adjacent to the switches. If said points are boldly rounded the switches need not be employed, as the trunnions will not exceed the nodes; but the sequinodes will be less complete and slightly intermittent. The sequinodes have two half-throw oscillations for each revolution of the sphere. This motion may be employed on sewing-machines, harvesters, churns, saws, looms, &c. It is evidently a subdivision or modification of the motion of the mechanism of plate 1. It is compound or trammeled ecliptic motion. Fig. 3 represents a sphere imposed on a matrix which is a sequinode. The ecliptic is compound. The similar ecliptics bisect each other a little beyond the maximeter. The short ends of the axial quadrants thus formed are boldly rounded and the long ends are gently rounded. The nodes are barricaded, as in Fig. 2. One revolution of the sphere produces two accelerated throws of the matrix. The motion is intermittent by the degree in which the short ends of the quadrants are rounded. The length of stroke is varied by the radial distance of the trunnion. This motion is therefore projectile, like that of falling bodies down a curve. Forge-hammers, &c., may be driven by it. The trunnion may also be inserted in the compound groove on either side of the switch N. The direction of the motion is thus reversed. Figs. 4 and 5 represent a sphere with similar ecliptics, as in Fig. 3, but the nodes are left open, and one path of the compound groove is closed by a switch, F, which runs parallel with the axis and intersects the major quadrant at the node N. The reverse side of the sphere has a stud, E′, nearly opposite the switch F in the same polar hemisphere. The matrix to this sphere is a circulator. It has a flaring cut, M, in its wall nearly opposite to the trunnion A. The stud E′ on the sphere engages the matrix in cut M, and trunnion A engages the sphere in the ecliptic groove, and these two complement each other's engagements in this manner. The switch F takes the trunnion and passes it under one end of the axle and transfers it to a position near the other end of the axle, and then the stud E′ engages the cut M in the matrix, passes it under the end of the axle, and transfers it to a point toward the other end of the axle, the ecliptic now acting alone to bring trunnion far enough around for the switch F to engage it. One revolution of the sphere produces one rotation of the circulator. If the stud E′ is removed the motion is oscillatory, as in Fig. 3, but not reversible. This gear is, therefore, a modification of Fig. 3, and is more than an equal substitute for miter-gear. The grooves can be made ample and the working-studs may be strong steel plugs. Fig. 7 represents the ecliptics further modified. Two similar ecliptics do not bisect each other, but intersect each other at one of the poles in such manner that the nodes are nearly in conjunction, the space between them being closed by the sphere-axle. The ecliptics are smaller circles. One of the solstices of each ecliptic is eliminated and the two remaining solstices stand in the same polar hemisphere opposite each other. One of the axial quadrants is also cut away, and the other is prolonged into a polar crescent, whose V-shaped tongues extend beyond the maximeter. A ring, Y, is afterward cut away from the polar crescent, to effect clearance for the trunnions, which circulate past the axle, from solstice, by way of the ecliptics, to solstice again. The matrix has two trunnions directly opposite, with the same radial distance. The exit of the trunnions, when under the one end of the axle, is in manner as stated in Figs. 4, 5, and 6, and each trunnion is transferred by the ecliptic groove around the sphere to the solstice just emerging out of the matrix; the other trunnion simultaneously travels up the other ecliptic groove to the place from which the exit was traced about. The trunnions and ecliptics therefore complement each other to effect each revolution. One revolution of the sphere produces one uniform rotation of the circulator. The motion is reversible. The motion may be made irregular by giving one of the ecliptics more pitch than the other, or by slightly varying the radial distances. For uniform motion it is deemed a pitch in both ecliptics of about thirty degrees from the sphere-axis will be found most practical. Figs. 8 and 9 represent spheres with polar crescents, as developed in Fig. 7, more or less incised at their middle toward the axle for clearance of the trunnions and for assisting their exit when under the axle. Three equidistant trunnions, with equal radial distances, are required in the matrix for this gear. One revolution of the sphere produces one rotation of the circulator. This is styled crescent-gear. The motion is reversible.

All the rotaries of this plate are obtained by slight modifications of the preceding one. They seem to be very practical, but may not prove equally so; but they all have this advantage—the sphere may be cast on the shaft ready for use, or cut in a lathe.

Figures 1, 2, 3, 4, 5, 6, 7, 8, 9, 10, 11:
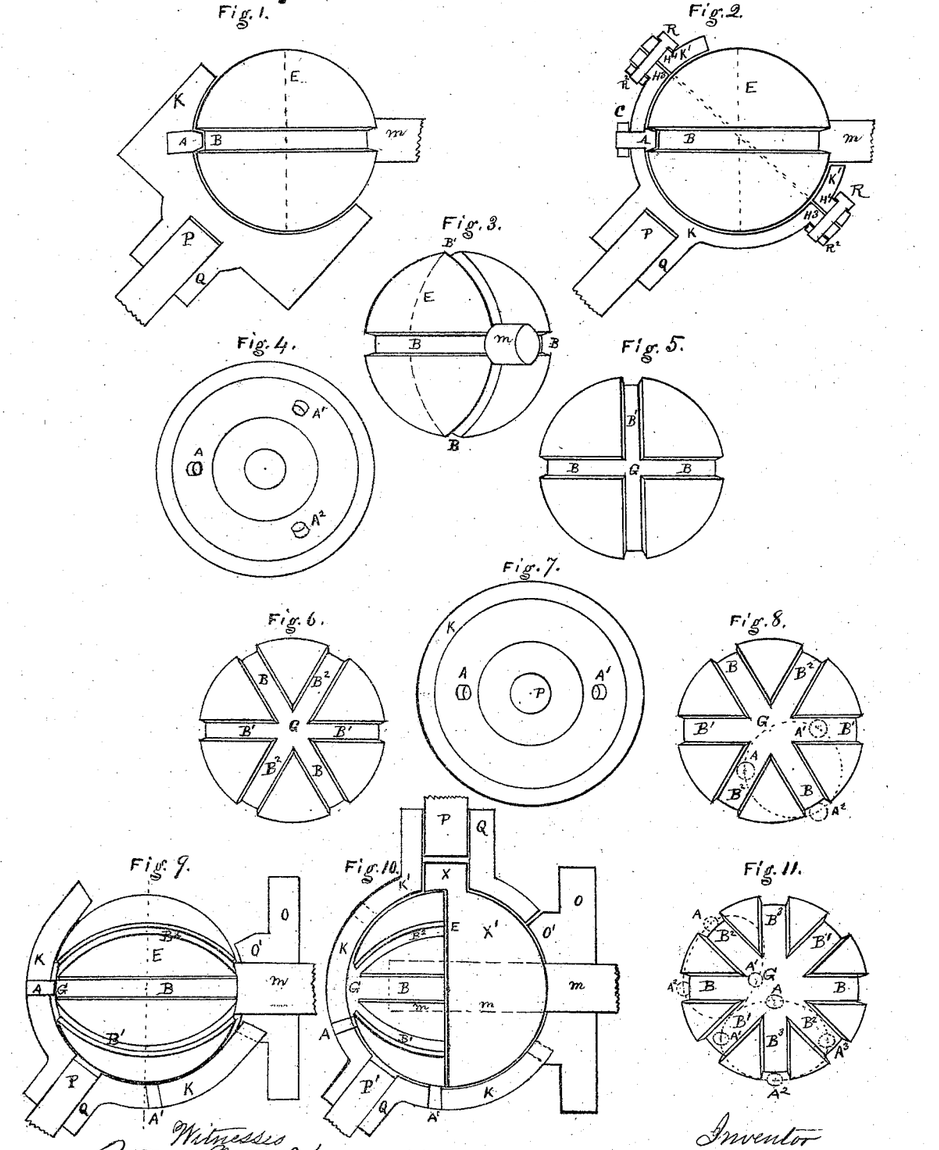
Figure 1:
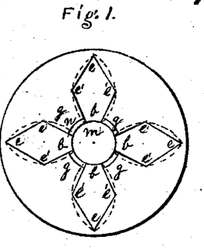
Figure 2:
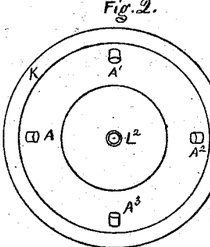
Figure 3:
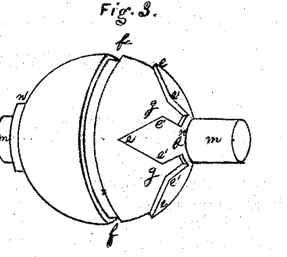
Figure 4:
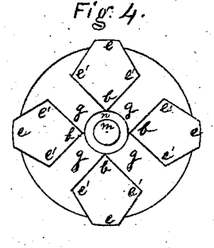
Figure 5:
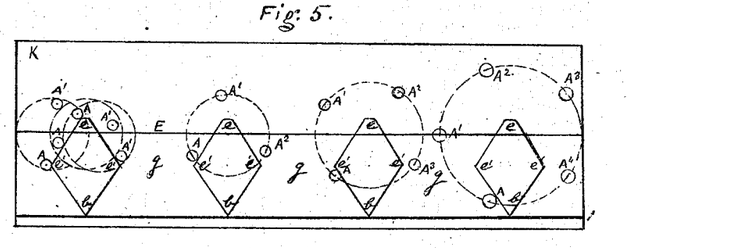
Figure 6:
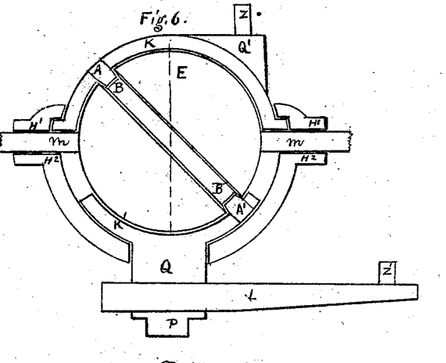
Figure 7:
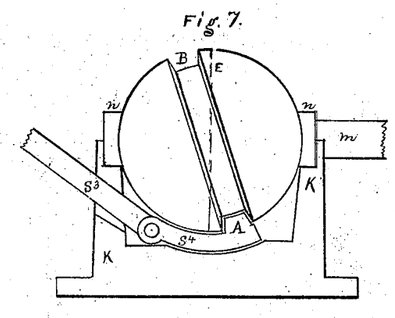
Figure 8:
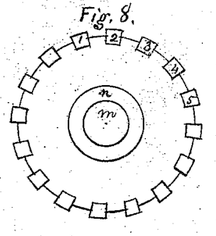
Figure 9:
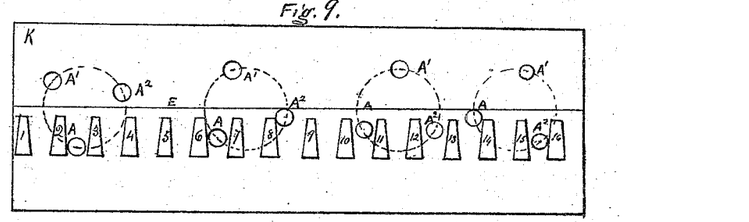

Résumé of plate 3: Simple and compound polar gear: If the axis of the matrix instead of the axis of the sphere be assumed as the line from which to reckon the ecliptic inclination, then the angle of forty-five degrees will be found the most practical, as in the plans of plate 1. Observing this relation of pitch, the axis of the matrix in plate 1 may be deflected from the perpendicular direction there shown, so that varying inclinations of the matrix-shaft may be assumed between those shown in plates 1 and 3. In plate 3 all the spheres shown in Figs. 1, 2, 3, 5, 6, 8, 9, and 11 are right spheres, and they differ only in respect to the number and gauge of the ecliptics. When more than one are employed they bisect each other at the poles and divide the maximeter into equal arcs. These bisections at the poles, more or less, cut away the polar space, and the space thus cleared is termed the circuit or escapement, through which the maximeter velocity is translated or interpolated to successively augment the velocity of the circulator. The augmented velocity thus obtained is as the breadth of the sphere subdivisions on the maximeter are to the breadth of the same where they cross the imaginary matrix-axis. These cuniform or wedge-like cuttings are termed ungulas. Regard the trunnions in the circulator as successive increments of gravity, and the pole as the focus of a system, then the translation of the trunnions through the escapement will correspond, in a mechanical view, with the successive sweep of planets through their perihelion, in an astronomical view. In both views the motion is accelerated. The explanation is partly anticipated. The ungulas successively engage the trunnions at the maximeter, while the trunnions directly opposite successively escape through the circuit unengaged; and the ones passing the circuit move faster than the taper points of the ungulas, one or more of which are therefore skipped by each successive trunnion as it travels across the circuit to register with the ecliptic groove next in the rear of the one last engaged. This is illustrated by all the figures of plate 3, except Figs. 1 and 2, which are not multiplying-gears. These excepted figures represent a right sphere with one groove and a matrix, which is a circulator of one trunnion, and is applied to the sphere obliquely. The trunnion is in line with the sphere-axis, but it may be outside of that line. The motion of the sphere is transferred to the circulator, more or less varied by the radial distance of its trunnion. The end of the matrix-shaft may be adjusted in a vertical arc, or be gyrated about the sphere as a center. All the matrix-axes shown in this plate may be wholly gyrated in this manner, but admit of only a limited adjustment in a vertical arc of a circle parallel with the sphere-axis. If the matrix-axis of Figs. 1 and 2 be adjusted through the vertical arc at certain points the rotary motion of the sphere will be converted into reciprocatory motion in the matrix. In Fig. 2 the shell-matrix K is supplemented by a spherical frustum, K'. These parts are united by bolts R through flanges $H^3 H^4$. The matrix is thus modified to serve the additional purpose of a locking-socket or universal joint. This device may be employed on drill-presses, rock-drills, excavators, couplings, &c. Figs. 3 and 5 represent the shaft and pole ends, respectively, of a sphere, scored into quadrants by two bisecting ecliptics. Fig. 4 is a top view of a block-circulator for the same, to be applied as shown in Fig. 1. Its equidistant trunnions $A A^1 A^2$ have a radial distance sufficient to present two of them into two adjacent grooves near the maximeter, one on each side of it, while the third is presented to the pole. By this arrangement each trunnion escapes or skips one ungula in passing the circuit; therefore, three revolutions of the sphere produce four rotations in the circulator, and vice versa. If two sphere-centered trunnions be employed instead of three, directly opposite each other, with radial distance sufficient to present one of the trunnions to the pole and the other a little beyond the maximeter, each trunnion will escape two ungulas in the circuit; therefore, one revolution of the sphere produces two rotations in the circulator, and vice versa. It may be shown that four trunnions produce uniform transmission from the sphere, none of the trunnions being set to skip in the circuit, which must be enlarged. Fig. 6 represents the pole of a sphere channeled by three bisecting ecliptics, cutting the surface into six equal crescents. Fig. 7 is a top view of its matrix with two trunnions, having radial distance sufficient to present one to the pole and the other to the maximeter. The result obtained by the union of these parts is: Two revolutions of the sphere produce three rotations of the circulator. Each trunnion escapes two ungulas in the circuit G. This shows that if a sphere is cut trilobed the same speed will be maintained, the circulator remaining the same, and is explained thus: each trunnion will then escape one lobe, equal to two ungulas, in the circuit. All these pole-gears are reversible, and the rates of speed will also be inverted. Fig. 8 represents the pole of a sphere, identical with that shown in Fig. 6, having wider cuts to enlarge the circuit G. If a matrix be applied to this sphere, having three trunnions, A $A^1$ $A^2$, so spaced that their circulation may not overstep the maximeter, one revolution of the sphere produces two revolutions of the circulator, and vice versa. If a matrix be applied to the same sphere, having two trunnions so spaced that their circulation may exceed the maximeter a little, three rotations of the circulator produce one revolution of the sphere. The converse motion requires the ungulas to be foreshortened to render it practical. This will, of course, increase the pitch of their points and enlarge the circuit. The pole will then present the appearance of an opening tulip flower. The radial distance must also be diminished. Fig. 11 represents the polar hemisphere, channeled by four bisecting similar ecliptics, and having an ample polar circuit, G. Matrices of varied constellation of trunnions may be employed. A circulator with four trunnions, A $A^1$ $A^2$ $A^3$, with radial distance such as to limit the circulation of the trunnions to the pole and maximeter score, will describe two rotations for each revolution of the sphere. If the circulator have three trunnions with radial distance such as to limit the circulation a little more, so that the trunnions travel between the pole and the maximeter score, the revolutions of the sphere will be to the rotations of the circulator as 3 is to 8. Circulators with more than four trunnions, and having their circulation properly determined, will describe rotations which are to the revolutions of the sphere as 8 to 5, as 8 to 6, or as 4 to 3, and as 8 to 7. The ratio as 4 to 1, made by two trunnions, requires the ungulas to be foreshortened to be reversible. The arrangement of the ecliptics on the spheres, shown in Figs. 9 and 10, is identical with that of Fig. 11. It is, however, evident that a greater number of ecliptics may be employed. Fig. 9 shows a shell-matrix, which is made to extend, in cylindrical form, beyond the limit of its hemispherical socket, and its rim is provided with cogs or teeth which engage similar teeth on a pinion on the hub of a loose pulley, O O', on the sphere-shaft $m$. Assuming the speed of sphere to be 1, that of the matrix 2, the ratio of the matrix-rim to the pinion $2\frac{1}{2}$, and the ratio of the pinion to the pulley 3, the speed of the pulley will be fifteen times that of the sphere. This large increase of speed may thus be attained in a very convenient narrow compass of means. There is a saving of metal, and perhaps the polar escapement may have an advantage in leverage over ordinary multiplying-gears. Fig. 10 shows a similar shell-matrix, not as much extended, geared on one side into a pinion, and on the other into a smaller shell-matrix, K', whose axis is at right angles to the sphere-axis. Shell K' is maintained in position by a standard, X, which enters the shell-hub as a bearing. Standard X is formed on a blank hemisphere, X', through which the sphere-axle passes loosely. The other channeled hemisphere is rigidly fastened on the end of axle $m$. All the parts are kept in spherical or arched union by the form of the parts and by the position of the shafts P P' $m$. The multiplying capacity of this gear is great, and its application is polygonal or multangular, and in part gyratory. The ungulus of the spheres shown in Figs. 3, 6, 8, 9, 11, may be foreshortened either by increasing the breadth of the ecliptic grooves or by a double lathe-cut in each groove. To obtain a double cut in each groove in a lathe, let the sphere be chucked in a lathe in such position that the imaginary middle plane of any proposed ecliptic groove, which is a great circle through the poles, may be parallel with the face-plate of the lathe; or, if great foreshortening is desired, that the poles of the sphere may dip toward and retreat from an assumed parallel plane to said face-plate, let a cut be made of half or more than half the breadth of the proposed ecliptic, keeping the tool-point toward the center of the sphere. Next, revolve the sphere half a circle and chuck it again, keeping the axis in the same plane as before. Cut an equal channel as before and the cuts will coalesce. The bottom of the cuts should curve concentric with the sphere surface. If the cuts are made to foreshorten, the ungulas or crescent will be removed through each pole in forming each ecliptic. The ungular points will be foreshortened in the same degree that said crescents are more or less slender. The inclination of the matrix-axis may be increased in the same degree that the ungulas are thus foreshortened, the polar circuit being accordingly enlarged. When the ungular points are made to retreat to the maximeter score, the inclination of the matrix-axis may be increased to a right angle, and the polar gears merge into direct maximeter gears or into gears on the ulterior pole. The radial distances and the constellations of trunnions will vary accordingly.

Résumé of plate 4: Spherical gears, derived partly from the compound ecliptics of plate 2 and partly from the compound polar gears of plate 3. All the views of this plate are therefore modifications. Their identity may be traced: First, if the ungulas of plate 3 are imagined to be foreshortened into the opposite polar zone. Second, if the crescent developed in Fig. 7, plate 2, is clipped or incised and duplicated about the pole. In general terms the working ledges of this plate are ecliptic cuttings or tablets left stand on the sphere after the cuttings are performed, having a pitch in relation to the axis of the sphere like that of the ecliptics from which they are derived. Each of the tablets has a point, $e'$ $e$ $e'$, directed toward the maximeter score or extending beyond it, like the axial quadrants in plate 2, which is here termed a "nib," and may be triangular, oval, or blunt. Each tablet also has a rear end directed toward the pole, termed a "limb." The distance across the tablet from $e'$ to $e'$ is termed the "bilge." The space between two adjacent limbs is termed a "dock," marked $g$. Figs. 1 and 3 represent a sphere, and Fig. 2 is a top view of its circulator. These constitute minor star-gear. The sphere has left stand around its axle a ring, $n$, to fill the matrix cross-section, and the matrix has a central stud, $L^2$, to engage a central groove, $f$, on the sphere. These devices are employed to counteract the action of the trunnions while engaging the tablets, the tendency being to throw the sphere to the opposite side of the matrix. The four trunnions, $A$ $A^1$ $A^2$ $A^3$, have radial distance enough to circulate deeply into the docks $g$, and not too deeply, so that they may clear ring $n$. The sides of the tablets are here shown to be angular, but their sides may be cut oval by sweeping cuts, which will circumscribe two adjacent tablets. The center of such circular cuts will be midway between the tablets, and with radius equal to about three-fourths of the sphere radius. All the tablets, in form, seem to have a forward pitch toward the nibs and a rear pitch toward the pole, but the rear pitch is converted into forward pitch by the dip of the sphere into the circulator, or in the oblique direction in which they make their exit out of the circulator cavity in the act of engaging the trunnions. Their real pitch, therefore, is a compound or differential curve. In the gear now explained one revolution of the sphere produces one rotation of the circulator, and, as in all the gears of this plate, it is reversible. Figs. 4, 6, and 8 are polar projections of spheres having tablets of different pitch, limit, and proximity; and Figs. 5, 7, and 9 are views of the same spheres prolated on the plan of Mercator, showing the number and order of the trunnions of their circulators. Figs. 4 and 5 represent double crescent gear. The tablets are large; their nibs cross the maximeter; their bilge is full; their docks are wide and rectangular. The nibs must lie across the maximeter when only two trunnions are used in the circulator, as may be seen on the left side of Fig. 5, where two trunnions are shown at different points of a revolution. The excess of the nib over said score does the cocking of the matrix over center. The nibs may be shorter when more trunnions are employed. The rates of speed indicated in Fig. 5 are as follows: The revolutions of the sphere are to the rotations of the matrix as 1 to 2, as 3 to 4, as 1 to 1, as 5 to 4. The tablets may be faced oval, in manner as recited above. Figs. 6 and 7 represent diamond-necklace gear. The tablets are small diamond points; their nibs fall short of the maximeter; they are many in number; their bilge is moderate; their docks are narrow and rectangular. The series of trunnions runs up from three. If the radial distance is such that only alternate tablets are engaged by the trunnions there will be intermediate rates of speed. So, likewise, when every third one is engaged. Therefore the revolutions of the sphere are to the rotations of the circulator as 3 to 5, as 3 to 10, as 2 to 5, as 1 to 2, as 4 to 5, as 1 to 1, as 6 to 5, as 7 to 10, &c. Figs. 8 and 9 represent meridian gear. The tablets are little, if any, tapered; they are slender ledges, running in the direction of the imaginary meridians, and depend mainly on the dip of the sphere for their pitch. They are near the maximeter girdle, and disengaged about half a quadrant from the pole. In Fig. 9 four positions are shown of the same trunnion as it may be imagined to pass from the bilge to the nib of the same tablet. The series of trunnions may be extended above three. The tablets being sixteen in number, and the series extended, the revolutions of the sphere are to the matrix rotations as 3 to 8, as 3 to 16, as 3 to 4, as 1 to 2, as 1 to 4, as 5 to 16, as 5 to 8, &c., taken successively, alternately, ternately, &c. Almost any rate may be attained, and there seems to be a gain over other multiplying-gears in the leverage—that is, the ratio of the radiuses of the driver and the driven part seem to be smaller. If an adjustable trunnion-rack be added to this circulator, so made that three or more trunnions may be made to engage the tablets successively, alternately, &c., the device will be a differential back-gear for lathes, &c.

The masks or covers $H^1$ $H^2$ of plate 1 are thus described. They are hemispherical shells of sufficient inside diameter to envelope the sphere and the matrix or matrices imposed thereon. They have semi-cylindrical limbs $H^3$ $H^4$ which form bearings inside on the sphere-axle $m$, and are held together by rings or nuts $H$ around said limbs. Either or both of the shells may be perforated to let the matrix-hub through, and this perforation may serve as a bearing to steady the hub. The sections may be made to part horizontally or vertically. In pole-gears they must part in the plane in which both the axes lie, and the limbs are arranged accordingly. These shells should be so recessed inside as to touch the moving parts only at points where they may require support to insure decision of motion. They may be further modified so as to hang or support the shafts, either by brackets above them or by supports beneath them. They may be made strong enough to unite shafts when their matrices rest on spheres. They serve to exclude dust and rubbish from the gears. They muffle the gears, so that the noise is shut in. They are safety devices, so that no harm to operatives can occur as compared with cog-gear or belt-gear. They may become, in connection with these gears, a new article of hardware merchandise as readily as globe-valves, pipe-joints, &c. They will be small as compared with wheel-gears, and the globes may be cast hollow. The trunnions may be stubs chilled in the matrices, or plugs or bolts through friction-rollers.

I claim—

1. Running-gears, when they are made in spherical form, as a new article of manufacture, substantially as hereinbefore set forth.

2. The combination of one or more ecliptics or ecliptic tablets, either on an oblique or on a right sphere, with one or more trunnions in a matrix, or its equivalent, substantially as and for the purposes hereinbefore set forth.

3. The combination of the sectional mask or cover with spherical gears, substantially as and for the purposes hereinbefore set forth.

4. The relievo cuttings in the matrix, as shown in Fig. 4, plate 1, substantially as and for the purposes hereinbefore set forth.

5. The combination of stud $L^2$, ring $n$, and groove $f$, shown in Figs. 2 and 3, plate 4, for the purpose set forth.

6. The matrix or circulator, when it is used as a hemispherical socket interiorly and as a pulley or fly-wheel exteriorly, substantially as hereinbefore set forth.

7. The matrix or circulator, when its rim is used as a toothed-wheel to increase speed or effect a multiplied radiation of axes, substantially as herein set forth.

8. The combination of a toothed major matrix, K, minor matrix K′, pinion O O′, hemispherical standard X X′, and a channeled hemispherical driver, shown in Fig. 10, plate 3, substantially in the manner as and for the purposes hereinbefore set forth.

9. The arrangement of two or more trunnions in the matrix by which the speed is modified, substantially as hereinbefore set forth.

10. The combination and arrangement of the parts K K′ of the locking-matrix, shown in Fig. 2, plate 3, substantially as and for the purposes set forth.

THEOPHILUS WEAVER.

Witnesses:
PETER STRICKER,
JOHN WORLEY.